United States Patent [19]

Balsells

[11] Patent Number: 4,876,781

[45] Date of Patent: Oct. 31, 1989

[54] METHOD OF MAKING A GARTER-TYPE AXIALLY RESILIENT COILED SPRING

[75] Inventor: Peter J. Balsells, P.O. Box 15092, Santa Ana, Calif. 92705

[73] Assignees: Peter J. Balsells, Santa Ana, Calif.; Joan C. Balsells

[21] Appl. No.: 268,217

[22] Filed: Nov. 7, 1988

Related U.S. Application Data

[62] Division of Ser. No. 186,018, Apr. 25, 1988, Pat. No. 4,826,144.

[51] Int. Cl.$^4$ .......................... B21F 37/02; B21F 3/12
[52] U.S. Cl. ......................................... 29/173; 29/446; 72/135; 140/89
[58] Field of Search .......................... 29/172, 173, 446; 267/1.5, 167, 180; 277/164, 165, 167, 205; 72/135; 140/89

[56] References Cited

U.S. PATENT DOCUMENTS

| | | | |
|---|---|---|---|
| 2,378,054 | 6/1945 | Blumensaadt | 140/89 |
| 2,587,810 | 3/1952 | Beyer | 267/167 X |
| 3,323,785 | 6/1967 | Mather | 267/167 |
| 3,468,527 | 9/1969 | Mather | 267/167 |
| 3,890,687 | 6/1975 | Goldberg | 29/173 |
| 3,966,183 | 6/1976 | Mayer, Sr. | 267/167 |
| 4,655,462 | 4/1987 | Balsells | 267/167 X |

Primary Examiner—Timothy V. Eley
Assistant Examiner—Peter Dungba Vo
Attorney, Agent, or Firm—Walter A. Hackler

[57] ABSTRACT

A garter-type axially resilient coil spring includes a plurality of coils canted along a centerline thereof with each coil having a trailing portion and leading portion. The disposition of the trailing portion is defined by a back angle between the trailing portion and a line normal to the centerline and the disposition of the leading portion is defined by a front angle between the leading portion and the normal line. Specific resilient performance, or load-deflection characteristics, of the spring is obtained by controlling the back angle. At selected back angles, the leading portion may be disposed at front angles beyond the range heretofore thought possible.

6 Claims, 3 Drawing Sheets

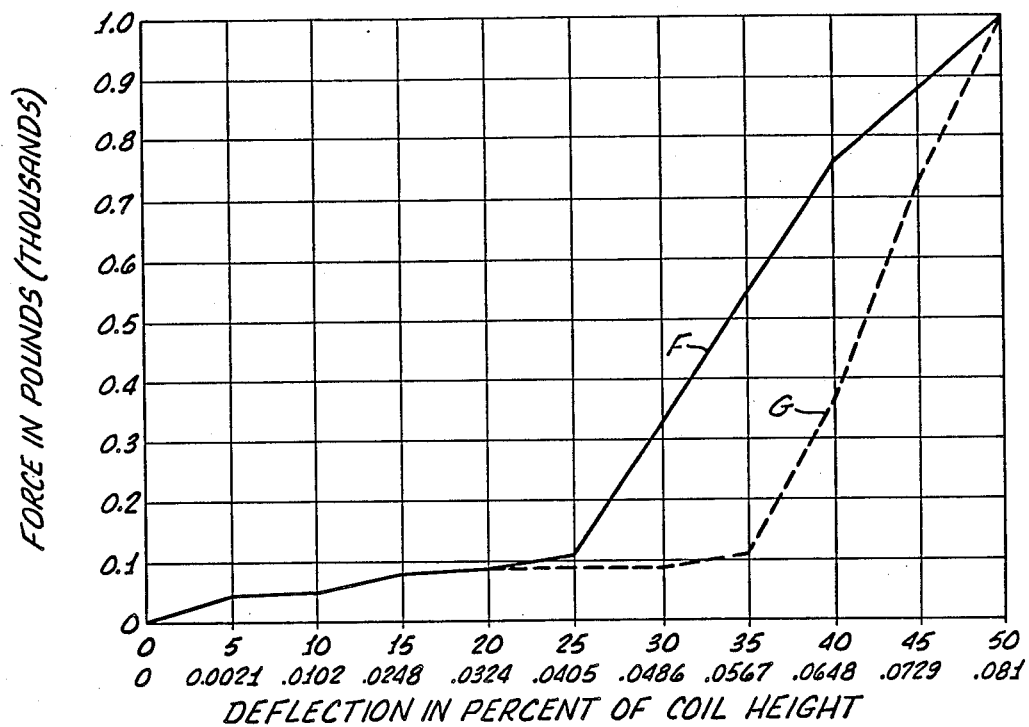
Fig. 6.
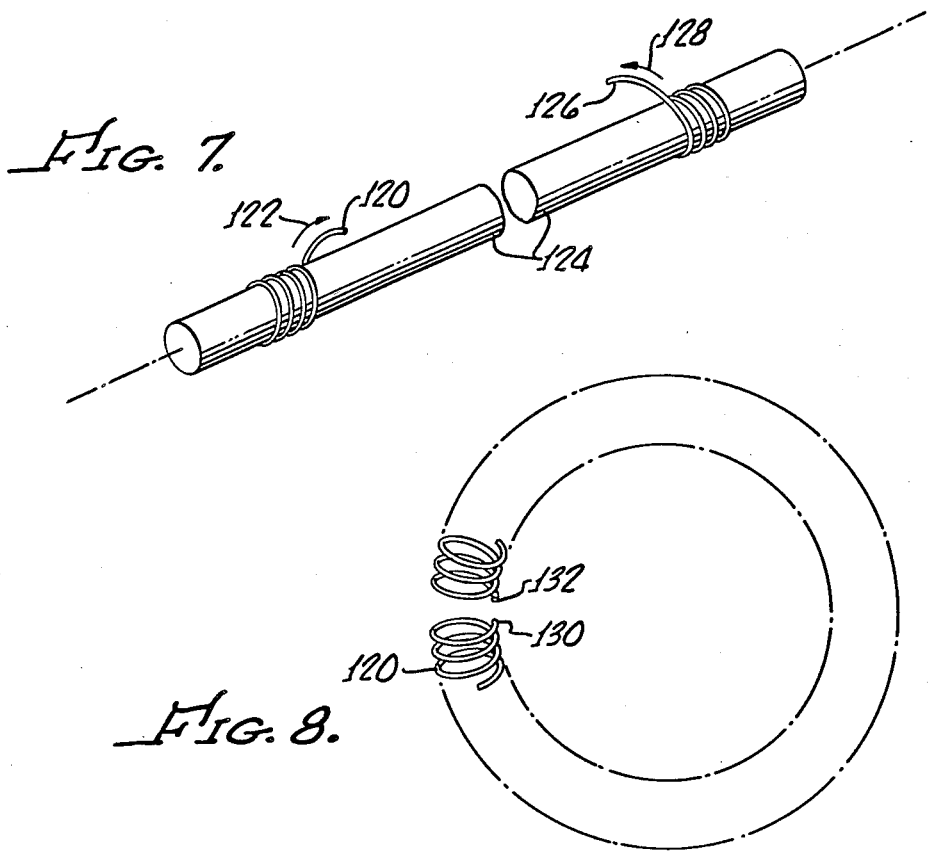
Fig. 7.
Fig. 8.

METHOD OF MAKING A GARTER-TYPE AXIALLY RESILIENT COILED SPRING

This application is a division of application Ser. No. 186,018 filed Apr. 25, 1988, now U.S. Pat. No. 4,826,144.

The present invention generally relates to compression springs and, more particularly, relates to a method for making annular canted coiled springs which exhibit preselected resilient, or load-deflection, characteristics, in response to axial loading of the springs. These springs are also known as garter-type springs because of their shape.

As disclosed by Mather in U.S. Pat. Nos. 3,323,735 and 3,468,527, annular canted coil springs in many applications are superior to Belleville, wave washers, or coil helical compression springs, and groups of compression springs arranged in a ring. This is particularly true for small springs in which the significant dimensions are substantially less than one inch.

The substantial number of different types of apparatus require garter-type springs, each having a specific load-deflection characteristic required by the apparatus. Hence, careful design of each garter-type spring must be made in order to tailor the resilient characteristics thereof to meet the needs of the proposed application. For example, a spring designed for use in a seal, preferably has a working deflection in which the spring provides a substantially even, or constant, force over a broad range of deflection. With this resilient characteristic, variation in the distance between the seal members, which may be caused by wear, does not affect the spring applied sealing pressure therebetween. Other applications require that the spring provide a linearly increasing force in response to deflection throughout a specific operating range, while in some cases even a negative load-deflection characteristic may be preferable.

Of particular importance are applications where the spring can maintain a predetermined load between untooled surfaces, which have greater tolerances, thus significantly reducing the cost of the unit through the use of such untooled parts. This is of advantage in electrical components, such as switches and the like.

The resilient characteristics of annular, or garter-type, springs, was investigated by Mather and disclosed in the hereinabove referenced U.S. patents. Mather varied the ratio of the diameter of the coil to the diameter of the wire and, in addition, controlled the angle of slant of the coils. Mather found that the angle of slant determines the resilient and energy-storing capacity of the spring under axial load. In addition, Mather teaches specific slant angle, or profile angle, limitations in the design of the annular springs.

It should be appreciated that while garter-type, or annular, springs, as a class, have the same general shape, wide performance variations exist depending upon the specific design of the spring. According to one classification, the annular spring may be either an axial load-bearing spring or a radial load-bearing spring.

As the classification implies, axial load-bearing springs are designed for accommodating axial loading, while radial load-bearing springs are designed for accommodating radial loading. The hereinabove referred to U.S. patents to Mather are exemplary of axial load-bearing springs and U.S. Pat. No. 4,655,462 to Balsells discloses that annular, or garter-type springs, may be designed for radial loading thereof.

The present invention represents a substantial improvement in the design of a garter-type axially loaded springs which provide for the tailoring of the resilient characteristics of the spring to a degree far beyond that possible heretofore. While the springs of the present invention may appear to be similar to prior art springs and their performance comparable to other springs in many applications, their design characteristics can be controlled in order to enable the springs produced in accordance with the method of the present invention to be used in applications not possible with heretofore annular springs.

For example, Mather in U.S. Pat. No. 3,468,527, primarily relies on the spring index which is the ratio of the diameter of the coil to the diameter of the wire to provide a means for adjusting the resilient characteristics of the spring. In U.S. Pat. No. 3,323,785, Mather teaches that a variation of its angle of slant $\alpha$ which is formed by the intersection of the planes containing the diameters of the individual coils, with a plane normal to the axis of the coil, in order to alter the resilient characteristics of the spring. This investigation found that springs could be made with the slant angles within the range of 35 to 55 degrees, with an optimal angle of slant of about 45 degrees.

The method and spring of the present invention overcomes the hereinabove identified limitations regarding the slant angle $\alpha$ as defined by Mather and provides for spring designs which incorporates spring parameters hereinbefore thought unworkable in view of the prior art.

SUMMARY OF THE INVENTION

In accordance with the present invention, a garter-type axial resilient coiled spring includes a plurality of coils canted along a centerline thereof. Back angle means are provided not only for defining the disposition of a trailing portion of each coil with respect to a line normal to the centerline, but also for determining the force-deflection characteristics including the working resilient range of the garter-type axially resilient coil spring.

Heretofore, no one has recognized the importance of the spring back angle, hereinafter described in greater detail, and its dominant effect on spring performance. That is, by controlling the back angle, which defines the trailing portion of each coil, the resilient characteristics can be designed to meet criteria heretofore not possible without the control selection and adjustment of back angle.

Front angle means, hereinafter described in greater detail, are provided for defining the disposition of a leading portion of each coil with respect to the normal line. In each instance, the front angle means is greater than the back angle means. Importantly, the front angle means may be less than 35 degrees, which is beyond the range taught by prior investigators.

The coils are interconnected in a manner forming a garter-type axially resilient coil spring with the trailing portion along an inside diameter of the garter-type axially resilient coil spring and the leading portion along an outside diameter of the garter-type axially resilient coil spring.

More particularly, the garter-type axially resilient coil spring, according to the present invention, may include a plurality of coils which are canted in a clockwise direction. More specifically, the back angle may be greater than one degree and less than 35 degrees, with the back angle means defining a working deflection in which the garter-type axially resilient coil spring exerts a generally constant force in an axial direction in response to the deflection of the garter-type axially resilient coil spring in the axial direction, with the working deflection being between about 10 percent and about 35 percent deflection of the spring.

In accordance with the present invention, a method for making a garter-type axially resilient coil spring includes the steps of winding a metallic wire to produce coils canted with respect to a centerline of the garter-type axially resilient coil spring, with each coil having a leading portion and a trailing portion. The wire may be wound so that the leading portion is disposed to a line normal to the center-line of the garter-type axially resilient spring and the trailing portion is disposed at a back angle to the normal line.

During winding of the wire, the magnitude of the back angle can be adjusted in order to achieve a preselected resiliency of the garter-type axially resilient coil spring. It should be appreciated that while the back angle is specifically controlled, the corresponding front angle may vary depending on the coil spacing, that is, the average distance between the coils.

Thereafter, two ends of the wound wire are attached in a manner forming a garter-type axially resilient coil spring with a trailing portion along the inside diameter of the garter-type axially resilient coil spring and the leading portion along an outside diameter of the garter-type axially resilient coil spring.

More specifically, the wire may be wound in a clockwise direction and the coils may be canted in a clockwise direction with regard to the centerline. During winding of the coil, the back angle is adjusted to determine the maximum mode and the total deflection load point of the garter-type axially resilient coil spring, and the front angle may be held constant while adjusting the back angle.

The back angle may be made greater than one degree and less than 35 degrees, and the front angle may be made less than 35 degrees. In each instance, the front angle is always greater than the back angle of the spring.

BRIEF DESCRIPTION OF THE DRAWINGS

The advantages and features of the present invention will appear from the following description when considered in conjunction with the accompanying drawings in which:

FIG. 6 is a force versus deflection curve showing the resilient characteristics of the spring as shown in FIGS. 5a and 5b;

FIG. 7 is a depiction of winding a coil spring in accordance with the method of the present invention; and FIG. 8 shows the step of welding ends of the coil springs to form a garter-type spring.

DETAILED DESCRIPTION

Figure 1:
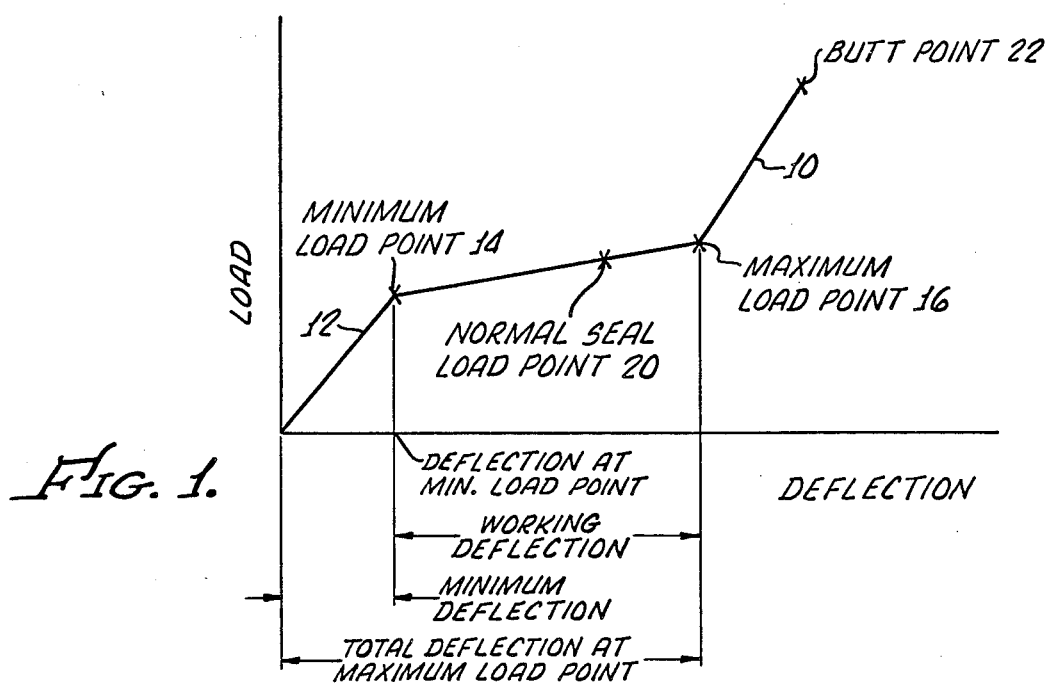
FIG. 1 is a theoretical load versus deflection curve illustrating the various parameters of an axially resilient coil spring.

Turning now to FIG. 1, there is shown an exemplary load deflection curve 10, for the purpose of illustrating the characteristics of canted coil garter-type axially resilient coil springs. As shown, when the load is axially applied to the spring, the spring deflects in a generally linearly fashion as shown, by the line in segment 12 until it reaches a minimum load point 14, which represents the point at which, after the initial deflection, the load begins to remain relatively constant.

Between the minimum load point 14 and the maximum load point 16, the load deflection curved may be constant or show a slight increase as shown in FIG. 1.

The area between the minimum load point 14 and the maximum load point 16 is known as the working deflection range. This spring is normally loaded for operation within this range, as indicated by point 20, for a typical spring utilized in conjunction with a seal, gasket, or the like, for sealing purposes. Loading of the spring beyond the maximum load point 16 results in an abrupt deflection response until it reaches a butt point 22, which results in a permanent set in the spring as a result of overloading. Also indicated in FIG. 1 is a total deflection range, which is defined as a deflection between the unloaded spring and the deflection of the maximum load point 16.

Figure 2A:
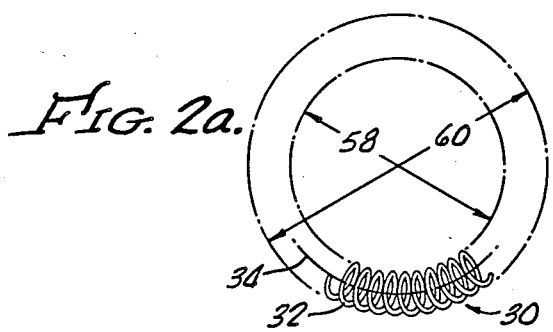
FIGS. 2a and 2b are plan and side views, respectively, of a circular welded clockwise spring, in accordance with the present invention, with a front angle on the outside of the spring and a back angle on the inside of the spring.

FIG. 2a shows a circular welded clockwise spring 30, in accordance with the present invention, generally showing a plurality of coils 32, which are canted in a clockwise direction along a centerline 34 thereof. As more clearly shown in 2b, each coil 32 includes a trailing portion 40 and a leading portion 42, with the trailing portion having a back angle 48 which provides for means for both defining the orientation of the trailing portion 40 of each coil 32 with respect to a normal line 50 and for determining the working resilient range of the spring 30 as hereinafter described in greater detail.

In addition, a front angle 54 provides the means for defining the orientation of the leading portion 42 of the coil 32 with respect to a normal line 50.

The spring 30 is formed by interconnecting the coils 32 in a manner forming a garter-type axially resilient coil spring with the trailing portion 40 along an inside diameter 58 (see FIG. 2a) of the spring 30 and a leading portion 42 along an outside diameter 60 of the spring 30.

Figure 2B:
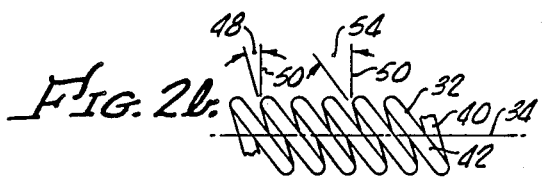

As can be seen most clearly in FIG. 2B, the spring 30, in accordance with the present invention, always has a leading portion 42 disposed at a front angle 54, which is greater than the back angle 48, defining the trailing portion 40. That is, as the coil is traced in the circular-like manner about the centerline 34, each revolution includes a trailing portion 40 and a leading portion 42, with the leading portion advancing movement along the centerline 34 more than the advancement along the centerline 34 when following the trailing portion 40 of the coil 32.

Figure 3:
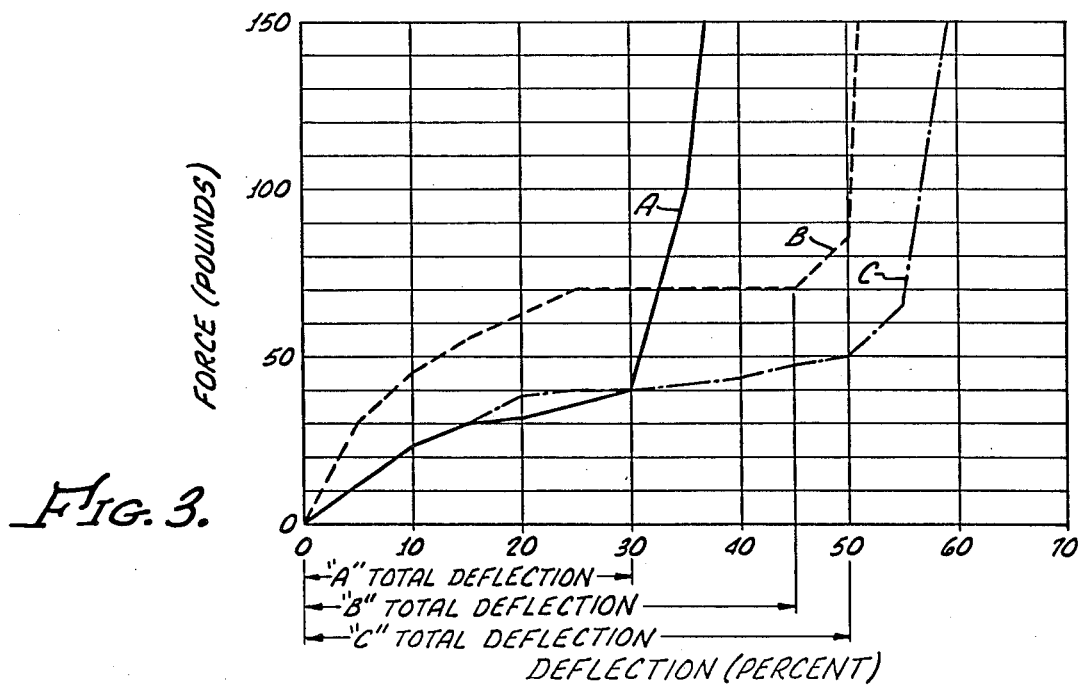
FIG. 3 is a load versus deflection curve for the springs shown in FIG. 2 and identified in Table 1 herein.

FIG. 3 shows force-deflection curves for springs, A, B and C, made in accordance with the present invention, and having specifications set forth in Table 1.

FIG. 3 shows the wide variation in force-deflection characteristics for springs made from the same wire diameter having the same spring inside diameter, the same coil height, with a constant front angle that can be obtained by a variation of the back angle 48. For illustration purposes only, the front angle is held at 38 degrees, which is at about the minimum value taught by Mather for coil springs in U.S. Pat. No. 3,323,785.

In general, Table 1, results are shown in FIG. 3, shows that the greater the spacing between the coils, the larger the deflection and the smaller the back angle. The back angle exerts the greatest influence on the spring resilient characteristics and not the front angle, and the greater the spacing between coils the greater the total deflection. As can be seen from FIG. 3, the force in the working deflection range of spring B is substantially greater than that in spring C. This characteristic is important when the springs are used in combination with a seal. Since the seals are generally made from a soft material, such as an elastomer or plastic, stress concentration is a prime consideration and the lower the stress concentration, the longer the life that can be effected on the seal.

TABLE 1

| Spring No. | (d) Wire Dia. (inch) | Spring I.D. (inch) | (D) Coil Height (inch) | Back Angle | Front Angle | Coil Spacing (inch) | Ratio D/d |
| --- | --- | --- | --- | --- | --- | --- | --- |
| A | .022 | .840 | .162 | 22° | 38° | .018 | 7.36 |
| B | " | " | " | 16.25° | 38° | .033 | " |
| C | " | " | " | 10.5° | 38° | .044 | " |

TABLE 2

| Spring No. | (d) Wire Dia. | Spring I.D. (inch) | (D) Coil Height (inch) | Back Angle | Front Angle | Coil Spacing (inch) | Ratio D/d |
| --- | --- | --- | --- | --- | --- | --- | --- |
| D | .022 | 0.756 | .162 | 9.25° | 25° | .018 | 7.36 |
| E | .016 | " | " | 9.5° | 21° | .016 | 10.125 |

That is, because springs, in accordance with the present invention, can exert an equal force compared to prior art springs using smaller wire with closer spaced coils, the stress concentration on cooperating seal material is less. This results in more effective sealing and greater seal life.

Figure 4:
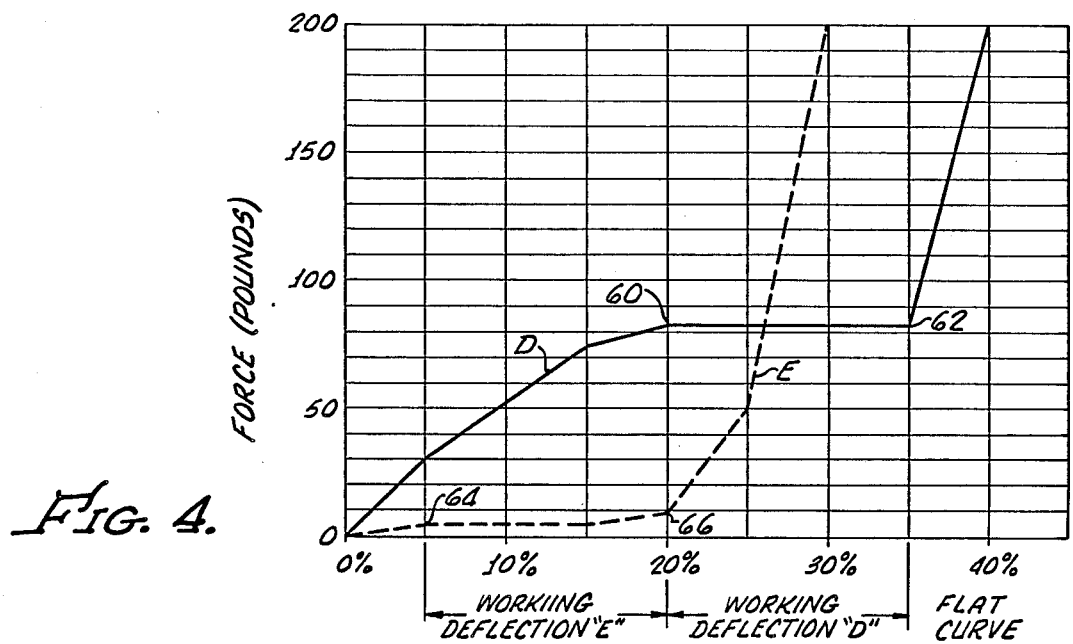
FIG. 4 is a load versus deflection curve for a spring, in accordance with the present invention, showing the characteristics of springs having a front angle of less than 35 degrees and identified in Table 2 herein.

FIG. 4 shows the force-deflection curve for two springs made with the specification set forth in Table 2. It should be noted that both of these springs are fabricated with front angles of 21 degrees and 25 degrees, respectively, which is substantially less than the minimum angle set forth in the prior art.

FIG. 4 shows that the larger the wire diameter, the higher the force, compare spring D to spring E, and the larger the D/d ratio, the faster the minimum load point is reached. It should be appreciated that in this comparison the coil spacing is nearly the same between the two springs. While curves D and E may look considerably different, an analysis of the two shows that each of them have the same working deflection, that is, the percentage deflection between points 60 and 62 of curve D is the same as the deflection between the points 64 and 66 of spring E. However, within this working deflection, the load is substantially different.

It should be appreciated then that the load characteristics and the working deflection of spring E can be increased by increasing the number of coils per inch, that is, decreasing the coil spacing. This provides for substantially less stress concentration on a cooperating seal, not shown, as hereinbefore described.

It is important to distinguish the spring 30, in accordance with the present invention, from outside back angle canted coil springs, such as those set forth, in companion U.S. patent application Ser. No. 186,016 filed on Mar. 25, 1988.

Figure 5B:
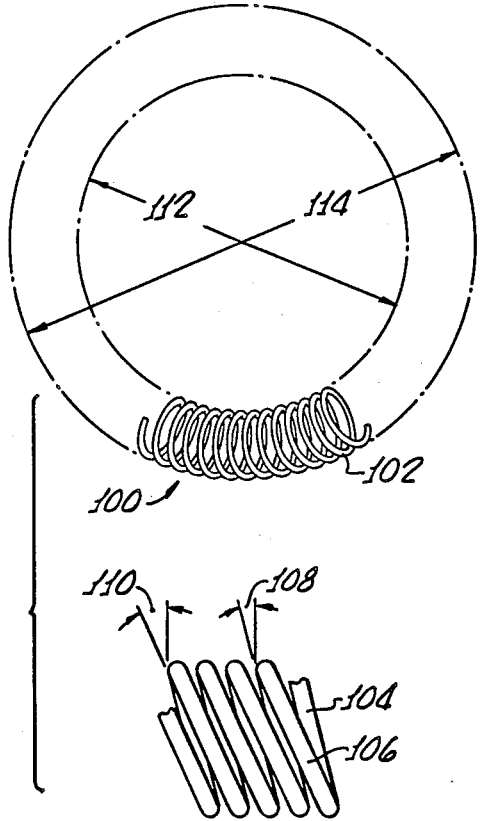
FIGS. 5a and 5b are plan and side views of circular welded clockwise and counterclockwise springs having the same physical dimensions illustrating the difference in construction of springs having the back angle on the outside (FIG. 5a) and on the inside (5b)
Figure 5A:
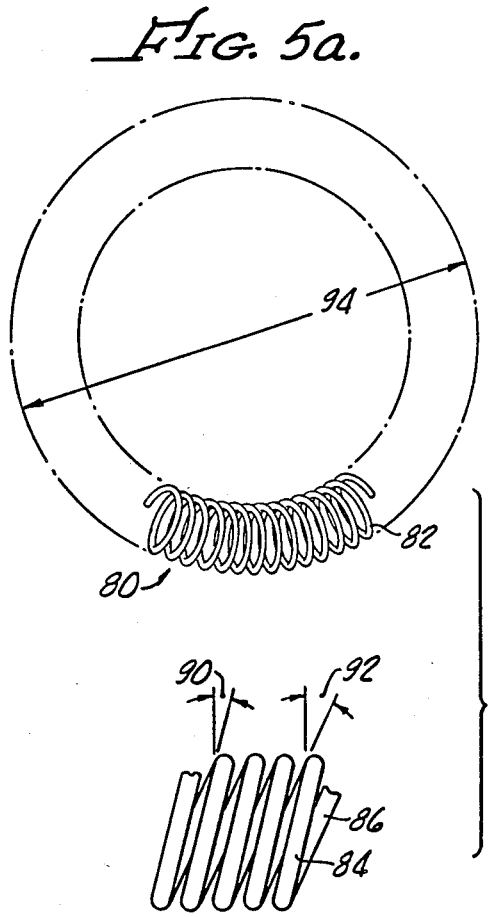

FIG. 5a shows a spring 80 having a plurality of coils 82, with a trailing portion 84 and a leading portion 86, which are defined, respectively, by a back angle 90 and a front angle 92. The spring of FIG. 5a represents a spring in which the back angle is along the outside diameter 94 of the spring 80. This is to be compared with a spring 100 shown in FIG. 5b, in accordance with the present invention, having coils 102, with each coil having a trailing portion 104 and a leading portion 106 disposed at a back angle 108 on the inside and a front angle 110 on the outside, respectively. The spring 100, however, has the trailing portion 104 along an inside diameter 112 of the spring 100, and the leading portion 106 along an outside diameter 114 of the spring 100.

Although the springs 80 and 100 are made to the same dimensions, namely, an inside diameter of approximately 0.84 inches, a coil height(h) of approximately 0.162 inches, a coil spacing(s) of approximately 0.044 inches, with wire having a diameter(d) 0.022 inches and each having a back angle of 14 degrees and a front angle of 25 degrees, the force-deflection performance of each of the springs is entirely different. This is illustrated in FIG. 6 which shows the force-deflection characteristics of the spring in terms of thousands of pounds versus the deflection of the coil in percent of the coil height. Curve F of FIG. 6 represents a performance of spring 80 while spring G represents a performance of spring 100. The two springs 80, 100 have almost identical force-deflection characteristics in their working deflection range, however, the maximum load points have a variation of about 40 percent. Hence, it is preferable when a greater working range is desired to utilize a spring with the leading portion along the outside diameter of the spring.

Turning to FIG. 7, there is shown a method for fabricating a garter-type axially resilient coil spring, in accordance with the present invention, by winding a wire 120 in a clockwise fashion as shown by the arrow 122 about a mandrel 124. Alternatively, a wire 126 may be wound in a counterclockwise direction, as shown by arrow 128 about the mandrel 124.

It should be appreciated that the wire may be wound counterclockwise and clockwise and, accordingly, the coils may cant clockwise or counterclockwise. In either case, the performance is the same as long as the back angle is carefully controlled. For example, during the winding of the wire, the magnitude of the back angle is adjusted in order to achieve the preselected resiliency of the garter-type axially resilient coil spring. Following the winding of the wire 120 or 126, the ends 130, 132 of the wound wire are attached to form a garter-type axially resilient coil spring as shown in FIG. 2b, with the leading portion 106 along the outside diameter 114 of the spring 100 and the trailing portion 104 along an inside diameter, 112 of the spring 100.

Although there has been hereinabove described a specific arrangement of a coil spring, in accordance with the present invention, for the purpose of illustrating the manner in which the invention may be used to advantage, it should be appreciated that the invention is not limited thereto. Accordingly, any and all modifications, variations or equivalent arrangements, which may occur to those skilled in the art, should be considered to be within the scope of the invention, as defined in the appended claims.

What is claimed is:

1. A method for making a garter-type axially resilient coiled spring comprising the steps of:

fabricating by winding a metallic wire to produce coils canted with respect to a centerline of the garter-type axially resilient coiled spring, each coil having a leading portion and a trailing portion, said leading portion being disposed at a front angle in a range from 0 to 35 degrees with respect to a line normal to a centerline of the garter-type axially resilient coiled spring and said trailing portion being disposed at a back angle to the normal line;

during fabricating of the wire-adjusting the magnitude of the back angle in order to achieve a preselected resiliency of the garter-type axially resilient coiled spring; and attaching two ends of the wound wire by welding in a manner that form forming a garter-type axially resilient coiled spring having the trailing portion along the inside diameter of the garter-type axially resilient coiled spring and the leading portion along the outside diameter of the garter-type axially resilient coiled spring.

2. The method according to claim 1 wherein the wire is fabricated in a clockwise direction and the coils are canted in a clockwise direction with respect to the centerline.

3. The method according to claim 1 wherein the back angle is adjusted to determine the maximum load and the total deflection maximum load point of the garter-type axially resilient coiled spring.

4. The method according to claim 1 the front angle is held constant while adjusting the back angle.

5. The method according to claim 1 wherein the back angle is made greater than one degree and less than 35 degrees.

6. The method according to claim 1 wherein the back angle is made to less than about 11 degrees.

* * * * *